United States Patent Office 3,051,084
Patented Aug. 28, 1962

3,051,084
RESINOUS COMPOSITIONS AND THEIR
PREPARATIONS
James R. Scheibli, Oakland, Calif., assignor to Shell Oil
Company, a corporation of Delaware
No Drawing. Filed Oct. 16, 1959, Ser. No. 846,814
15 Claims. (Cl. 260—37)

This invention relates to new resinous compositions and their preparation. More particularly, the invention relates to new polyepoxide compositions containing a special extending and flexibilizing material, and to their use, particularly in the preparation of coating and sealing compositions.

Specifically, the invention provides new and particularly useful compositions comprising (1) a polyepoxide possessing more than one vic-epoxy group, and preferably a glycidyl polyether of a polyhydric phenol, and (2) at least 20% by weight of the combined mixture of a polyalkylated phenol wherein at least one of the alkyl groups contains at least 7 carbon atoms, and preferably dinonyl phenol. The invention further provides insoluble infusible products obtained by treating the above-described compositions with epoxy curing agents, and particularly amines, acids, acid anhydrides and $BF_3$ complexes.

As a special embodiment, the invention further provides a method for utilizing the above-described compositions as binders for skid resistant grit layers for cement, asphalt and metal surfaces and as binders for aggregate in the construction of new roadways and walkway surfaces.

There is a growing need for a cheap surfacing composition that can be applied to surfaces such as concrete, both cement and asphaltic, and metal surfaces to protect them from being worn away and broken up by constant use and exposure to inclement weather conditions. There is also a need for such a coating for cement and asphaltic roadways and walkways to reduce their tendency to skid when wet. In the case of the asphaltic surfaces, there is a further need for coatings which would improve resistance to solvents. This is particularly urgent in the case of asphalt runways for jet aircraft as the jet fuels readily attack and soften asphalt surfaces.

Various coatings have been suggested for the above applications, but they have not proved very satisfactory. In many cases, the coatings have failed to have the necessary adhesion to the surface, such as cement, asphalt and metal. In other cases, the coatings fail to stand up under constant wear and exposure to weather. In still other cases, the coating tends to be brittle and easily cracked, particularly when applied in large areas. In still other cases, the coatings fail to have the necessary solvent resistance and resistance to skidding when wet. Further, in many cases, the coatings require a long time for cure or require special curing conditions. In other cases, the coatings are too expensive for use on large areas as roadways and walkways.

It is, therefore, an object of the invention to provide new and improved resinous compositions and a method for their preparation. It is a further object to provide new resinous compositions which are particularly useful as surface coatings, particularly for cement, asphalt and metal surfaces. It is a further object to provide new polyepoxide compositions which cure rapidly to form coatings having improved flexibility and distensibility. It is a further object to provide new coating compositions containing polyepoxides which have good resistance to wear and weather conditions. It is a further object to provide new coating compositions which have resistance to solvents, such as ketones and jet fuels. It is a further object to provide new resinous compositions which can be used to provide skid-resistance to cement and asphalt and metal surfaces. It is a further object to provide new polyepoxide compositions which have low viscosities and can be employed without the use of solvents. It is a further object to provide new coating compositions which contain large amounts of inexpensive extenders. Other objects and advantages of the invention will be apparent from the following detailed description thereof.

It has now been discovered that these and other objects may be accomplished by the compositions of the invention comprising a mixture of (1) a polyepoxide possessing more than one vic-epoxy group, and preferably a glycidyl polyether of a polyhydric phenol, and (2) at least 20% by weight of the combined mixture of a polyalkylated phenol wherein at least one of the alkyl groups contains at least 7 carbon atoms, and preferably dinonyl phenol. It has been found that these compositions when combined with curing agents, such as aliphatic amines, cure rapidly at low temperatures to form hard and tough homogeneous coatings. The coatings have good adhesion to cement, asphalt and metal surfaces. In addition, the coatings have good resistance to wear and resistance to solvents and jet fuels. The coatings are particularly attractive in that they can be prepared at a low cost, can be easily applied to large areas without the use of solvents and cure very rapidly at low temperatures.

When small inert particles are added to the compositions before or during cure, the cured coatings also display excellent resistance to skidding. The coatings are particularly attractive for use on highways and runways, as they can be easily applied to large areas and set up quickly without the use of any special curing conditions.

The new compositions have been found to be useful as binders for aggregate in the formation of top coatings or as roadways, runways and walkways.

The polyepoxides to be used in preparing the compositions of the invention comprise those materials possessing more than one vicinal epoxy group, i.e., more than one

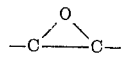

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl)

pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3 - epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4- epoxyhexyl 3,4 - epoxyhexyl 3,4-epoxypentanoate, 3,4-epoxycyclohexyl, 3,4-epoxyclclohexanoate, 3,4-epoxycyclohexyl, 4,5 - epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids, such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11 - diepoxyhexadecanedioate, didecyl 9-epoxy-ethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1, 2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly useful for the compositions of the invention are the glycidyl ethers and especially the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and polyether B described in the above-noted U.S. 2,633,458 are good examples of polyepoxides of this type. Other examples includes the polyglycidyl ether of 1,1,2,2-tetrakis(4-hydroxyphenyl)ethane (epoxy value of 0.45 eq./100 g. and melting point 85° C.) and the glycidyl ethers of novolac resins obtained by reacting phenols with formaldehyde.

The other component to be used in the compositions of the invention comprises the polyalkylated phenols wherein at least one of the alkyl groups contains at least 7 carbon atoms. These phenols may be monohydric or polyhydric and may be substituted with other substituents, such as chlorine, ether radicals and the like. The positions of the alkyl groups on the ring are not important, but are preferably in the ortho and para positions relative to the phenolic OH groups. Examples of the polyalkylated phenols include, among others, dinonyl phenol, dioctyl phenol, didodecyl phenol, ditetradecyl phenol, dioctadecyl phenol, trinonyl phenol, tridodecyl phenol, 2,2-bis(3-nonyl-4-hydroxyphenyl) propane, di(4-hydroxy-6-octaphenyl) pentane and di(4-hydroxy-2,6-dinonylphenyl) methane, nonyl dodecylphenol, tetraoctadecyl phenol and the like.

Preferred polyalkylated phenols to be employed include those having from 2 to 4 alkyl groups all of which contain from 7 to 20 carbon atoms each, such as, for example, dinonyl phenol, trinonyl phenol, dioctyl phenol, trioctyl phenol, dieicosanyl phenol, trieicosanyl phenol, dioctadecyl phenol, trioctadecyl phenol and the like.

Coming under special consideration, particularly because of their low cost and superior properties obtained therewith are the crudes obtained by the alkylation of phenols with long chain hydrocarbons to obtain derivatives for detergent purposes. Such crudes normally contain large amounts of the dialkylated phenol along with portions of the monoalkylated and possibly trialkylated or higher alkylated products. Crude dinonyl phenol which has been found to be particularly useful, for example, contains large amounts of dinonyl phenol along with mononyl phenol.

The compositions of the invention may be prepared by any suitable method. The compositions may be prepared, for example, by simply mixing the two components together with or without the application of heat. With liquid polyepoxides, the mixtures will have low viscosities and it is not necessary to employ solvents or diluents. However, if desired, various solvents or diluents which will evaporate before or during cure may be added to assist in the preparation of the mixtures. Suitable solvents include, among others, hydrocarbons, such as xylene, benzene and the like. It is also convenient to sometimes use liquid polyepoxides, such as normally liquid glycidyl polyethers of polyhydric alcohols, or to utilize monoglycidyl derivatives such as butaglycidyl ether, phenol glycidyl ether and the like.

The ratio of the two components to be utilized in the above compositions may vary within certain limits. The amount of the polyalkylated phenol should be at least 20% by weight of the combined mixture and preferably from 30% to 80% by weight of the mixture. The polyepoxide should make up at least 10% by weight of the combined mixture and preferably from 20% to 70% by weight of the mixture.

As noted above, the compositions of the invention may also be used as binders for grit layers for the coating of already prepared concrete and metal surfaces and as binders for aggregate in the preparation of new roadways and walkways. In the case of the grit layers, the compositions are combined with a relatively large proportion of hard abrasive inert particles which are preferably finely divided and have a mesh size varying from about 4 to 500. Preferred materials include sand, crushed rock, finely divided shells, crushed quartz, aluminum oxide, finely divided resinous particles and the like. Preferred materials to be employed are the minerals and especially the siliceous materials, such as, for example, sand and ground rock. Mixtures of various types of particles may also be employed.

When being used as a binder for aggregate for the preparation of new roadways, the above compositions are mixed with various types of aggregate, such as ground rock and the like which have a larger size than the aforedescribed grit particles. These materials preferably have a mesh size varying from about 0 to 20.

The amount of the inert particles and aggregate employed preferably comprises at least 50% by weight of the above-composition and still more preferably makes up from 75% to 1000% by weight of the above composition.

In making the grit layers and the roadway compositions, the particles and aggregate may be added at anytime during the preparation of or after the preparation of the above-described compositions. It is also possible, preferably in the case of the grit layers, to apply the composition as a coating and then sprinkle the inert particles on the top of the coating and then compact by means of rollers and the like.

When used as coatings, the compositions of the invention may be applied to any surface, but are particularly suitable for use as surfacing compositions for cement, asphalt, wood, and steel. The cement surfaces may be any of the usual types such as may be prepared from hydraulic cements, such as Portland cement and other types of aluminous and oxy salt type cements. The asphalt surfaces may be those prepared from straight run asphalts or further refined or modified asphalts. The compositions may be applied in very thin coatings or in very thick coatings. The application to the surface can be accomplished in any suitable manner. If material is thick or contains large amounts of inert particles, the material may best be applied by use of a screed, trowel, shovel or broom. If it is of a more fluid nature, it may be applied by brushing or spraying. The coatings will generally vary in thickness from about 1/16 inch to about 1/2 inch.

The compositions of the invention may be utilized for a great variety of other applications. They may be used, for example, in the preparation of roofing materials, castings and encapsulations, impregnating compositions, as coatings for pipes and outdoor wood and metal equipment, and in the lamination field.

A variety of substances may be used as hardening agents for the resin-forming ingredients of the composition such as alkalies like sodium or potassium hydroxide; alkali phenoxides like sodium phenoxides, carboxylic acids or anhydrides such as oxalic acid or phthalic anhydride; Friedel-Crafts metal halides like aluminum chloride, zinc chloride, ferric chloride, or boron trifluoride, as well as complexes thereof with ethers, acid anhydrides, ketones, diazonium salts, etc.; phosphoric acid and partial esters thereof including n-butyl ortho-phosphate, diethyl ortho-phosphate and hexaethyl tetraphosphate; and amino compounds such as triethylamine, ethylene diamine, diethylamine, diethylene triamine, triethylene tetramine, pyridine, piperidine, N,N'-diethyl-1,3-propane-diamine, dicyandiamide, melamine, fatty acid salts of amines, and the like. The curing agent is added and mixed in with the composition after its preparation as noted above. The amounts vary considerably depending upon the particular agent employed. For the alkalies or phenoxides, 1% to 4% is generally suitable. With phosphoric acid and esters thereof, good results are obtained with 1 to 10% added. The amino compounds are preferably used in amounts of about 5 to 15% and the others involve addition of about 1 to 45%.

Other resinous products having valuable properties may be obtained by reacting the polyalkylated phenols with aldehydes or ketones to form new polyhydric phenols and then reacting the phenols with epichlorohydrin in the presence of alkali to form the glycidyl ethers. These ethers may then be cured with the above-noted epoxy curing agents to form hard insoluble products.

The following examples illustrate the present invention. Unless otherwise specified, parts disclosed in the examples are parts by weight. Polyether resins described in the examples by letters are those described in U.S. 2,633,458. The concrete used in the example was prepared from hydraulic cement (Portland cement), aggregate, sand and water. Unless otherwise indicated, parts disclosed in the examples are parts by weight.

*Example I*

This example illustrates the preparation and some of the properties of a composition containing polyether A and dinonyl phenol.

50% by weight of polyether A and 50% by weight of dinonyl phenol were combined together with stirring. 13 parts per 100 parts of polyether A of diethylene triamine were added to the mixture. The mixture was a light colored fluid of low viscosity. The mixture was spread out on tin panels and allowed to cure at room temperature. The coating was very hard and had good flexibility as indicated by impact test wherein 720 gr. ball is dropped on the plate from 50 cm. The coating also had resistance to petroleum solvents and to boiling water.

A composition was prepared as above and spread out as a thin film on cement concrete surfaces. The film was then allowed to set hard at room temperature. The resulting coating showed good adhesion to the cement and had good hardness and abrasion resistance.

A further composition was prepared as above and spread out as a thin film on cement surface. 100% by weight of sand was sprinkled on the composition and compacted by rolling. This combination was then allowed to dry at room temperature. The resulting coating was a hard tough film having good skid resistance.

*Example II*

Example I was repeated with the exception that the ratio of components was changed as follows:

| Polyether A, percent: | Dinonyl phenol, percent |
|---|---|
| 20 | 80 |
| 40 | 60 |
| 60 | 40 |
| 80 | 20 |

Related results are obtained in each case.

*Example III*

This example illustrates the preparation and some of the properties of a composition containing polyether A and crude didodecyl phenol containing some monododecyl phenol.

50% by weight of polyether A and 50% by weight of crude didodecyl phenol were combined together with stirring. 13 parts per 100 parts of polyether A of diethylene triamine were then added to the mixture. This mixture was a light colored fluid of low viscosity. The mixture was then spread out as a coating on tin panels and allowed to cure at room temperature. The resulting coating was hard and tough and had good flexibility as indicated by the above-noted impact test, and good resistance to petroleum solvents and boiling water.

A composition was prepared as above and spread out as a thin film on cement concrete surfaces. The film was then allowed to set hard at room temperature. The resulting coating showed good adhesion to the cement and had good hardness and abrasion resistance.

A further composition was prepared as above and spread out as a thin film on cement surface. 100% by weight of sand was sprinkled on the composition and compacted with a roller. This combination was then allowed to cure at room temperature. The resulting coating was a hard tough film having good skid resistance.

*Example IV*

Example III was repeated with the exception that the ratio of components was changed as follows:

| Polyether A, percent: | Didodecyl phenol, percent |
|---|---|
| 25 | 75 |
| 40 | 60 |
| 60 | 40 |

Related results are obtained in each case.

*Example V*

Examples I to IV are repeated with the exception that polyether A is replaced by equivalent amounts of each of the following: polyether B, polyether C and a mixture of polyether D and polyether A.

*Example VI*

50% by weight of polyether A and 50% by weight of dioctylphenol were combined with stirring. 13 parts by weight of diethylene triamine (based on weight of the polyether A) were then added to the mixture. The mixture was stirred and spread out as a thin film on tin panels. The resulting film was hard and flexible and had good resistance to petroleum solvents and boiling water.

A similar composition was prepared and spread out as a thin film on cement concrete. This film was allowed to cure at room temperature. The resulting coating had good adhesion to the concrete and was hard and tough.

*Example VII*

Example VI is repeated with the exception that the dioctylphenol is replaced with ditetradecyl phenol and a mixture of dinonyl phenol and monononyl phenol. Related results are obtained in each case.

*Example VIII*

This example illustrates the preparation and some of the properties of a composition containing polyether A and di(hydroxydinonylphenol) methane.

50% by weight of polyether A and 50% by weight of di(hydroxydinonylphenol) methane were combined together with stirring. 13 parts per 100 parts of polyether A of diethylene triamine were then added to the mixture. The mixture was a fluid of low viscosity. The mixture was then spread out as a thin film on tin panels and allowed to cure at room temperautre. The resulting coating was hard and tough and had good flexibility and good resistance to boiling water.

A composition was prepared as above and spread out as a thin film on cement. The film was allowed to set hard at room temperature. The resulting coating had good adhesion to cement and was hard and tough and had good resistance to water.

*Example IX*

Examples I to VIII are repeated with the exception that the curing agent employed is an equivalent amount of each of the following: 1,4-diaminocyclohexene, N-ethylaminopiperazine, triethylene tetramine, ethylene diamine and BF₃-monobutylether. Related results are obtained.

*Example X*

Examples I to VIII are repeated with the exception that the mixture of polyepoxide and polyalkylated phenol was combined with an equivalent amount of each of the following and the mixtures heated to 150° C.: hexahydrophthalic anhydride, phthalic anhydride, metaphenylene diamine and methylene dianiline. Hard tough flexible products are obtained.

*Example XI*

Examples I to IV and VI to X are repeated using the following in place of the polyethers: epoxidized soybean oil, epoxidized tetrahydrobenzyl tetrahydrobenzoate, and epoxidized bis(4-cyclohexenyl) propane.

I claim as my invention:

1. A composition comprising a mixture of (1) a polyepoxide having more than one vic-epoxy group and (2) at least 20% by weight of the mixture of a polyalkylated phenol possessing from 2 to 3 alkyl groups each of which contains at least 7 carbon atoms.

2. A composition comprising a mixture of (1) from 20% to 80% by weight of a polyepoxide having more than one vic-epoxy group and being made up only of elements of the group consisting of carbon, hydrogen and oxygen, and having a molecular weight below 1000, and (2) from 20% to 80% by weight of a polyalkylated phenol possessing from 2 to 3 alkyl groups each of which contains from 7 to 20 carbon atoms.

3. A composition as in claim 2 wherein the polyepoxide is a glycidyl polyether of a polyhydric phenol having a molecular weight between 250 and 900.

4. A composition as in claim 2 wherein the polyalkylated phenol is dinonyl phenol.

5. A composition as in claim 2 wherein the polyalkylated phenol is dododecyl phenol.

6. A composition as in claim 2 wherein the polyalkylated phenol is dioctyl phenol.

7. A composition as in claim 2 wherein the polyalkylated phenol is a mixture of polyalkylated phenols and monoalkylated phenols wherein the alkyl groups in both contain at least 7 carbon atoms.

8. A composition comprising 20% to 80% by weight of a glycidyl polyether of 2,2-bis(4-hydroxyphenyl)propane and 80% to 20% by weight of dinonyl phenol.

9. A composition for rendering surfaces non-skid comprising a mixture of (1) a polyepoxide possessing more than one vic-epoxy group, (2) at least 20% by weight of (1) and (2) of a polyalkylated phenol possessing from 2 to 3 alkyl groups each of which contains at least 7 carbon atoms, and (3) at least 50% by weight of the combined mixture of (1) and (2) of small hard inert particles.

10. A composition for rendering surfaces non-skid comprising a mixture of (1) a glycidyl polyether of a polyhydric phenol, (2) at least 20% by weight of (1) and (2) of dinonyl phenol, and (3) at least 50% to 1000% by weight of the combined mixture of (1) and (2) of abrasive particles.

11. A composition as in claims 1 to 10 wherein an epoxy curing agent is present.

12. A process for preparing an insoluble infusible flexible resinous composition comprising mixing and reacting (1) a polyepoxide having more than one vic-epoxy group and (2) at least 20% by weight of a polyalkylated phenol possessing from 2 to 3 alkyl groups each of which contains at least 7 carbon atoms, with a hardening amount of an epoxy curing agent.

13. A process for preparing an insoluble infusible composition as in claim 12 wherein the epoxy curing agent is an amine.

14. A process for preparing an insoluble infusible composition as in claim 12 wherein the epoxy curing agent is a BF₃ complex.

15. A process for preparing an insoluble infusible composition as in claim 12 wherein the epoxy curing agent is an acid anhydride.

References Cited in the file of this patent

UNITED STATES PATENTS

| | | |
|---|---|---|
| 1,915,814 | Mason et al. | June 27, 1933 |
| 2,528,417 | Bradley | Oct. 31, 1950 |
| 2,768,992 | Formo et al. | Oct. 30, 1956 |
| 2,773,048 | Zukas | Dec. 4, 1956 |
| 2,937,580 | Spaulding et al. | May 24, 1960 |